United States Patent
Maguire et al.

(10) Patent No.: US 7,392,714 B2
(45) Date of Patent: Jul. 1, 2008

(54) TORQUE MONITORING SYSTEM AND METHOD OF MONITORING ENGINE TORQUE

(75) Inventors: Joel M. Maguire, Northville, MI (US); John R. Maten, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 263 days.

(21) Appl. No.: 11/293,862

(22) Filed: Dec. 2, 2005

(65) Prior Publication Data
US 2007/0125184 A1 Jun. 7, 2007

(51) Int. Cl.
F16D 23/10 (2006.01)
G01L 3/14 (2006.01)

(52) U.S. Cl. .................... 73/862.37; 73/116; 192/105 A

(58) Field of Classification Search ........... 73/116–120, 73/862.37; 192/105 A, 105 R
See application file for complete search history.

(56) References Cited

U.S. PATENT DOCUMENTS

| | | | | |
|---|---|---|---|---|
| 3,403,763 A | * | 10/1968 | Black et al. | 192/56.31 |
| 3,913,715 A | * | 10/1975 | Groves | 192/103 FA |
| 4,135,390 A | | 1/1979 | Templin | 73/136 |
| 5,319,949 A | * | 6/1994 | Long et al. | 60/347 |
| 5,485,757 A | | 1/1996 | Foxwell | 73/862.321 |
| 5,879,253 A | * | 3/1999 | Friedmann et al. | 474/18 |
| 6,269,702 B1 | * | 8/2001 | Lambson | 73/862.045 |
| 6,991,584 B2 | * | 1/2006 | Cowan | 477/110 |
| 7,212,935 B1 | * | 5/2007 | O'Brien et al. | 702/87 |
| 7,234,578 B2 | * | 6/2007 | Tsunekawa | 192/3.3 |
| 2001/0008197 A1 | * | 7/2001 | Maienschein et al. | 192/3.29 |
| 2001/0013454 A1 | * | 8/2001 | Yamamoto | 192/70.12 |
| 2007/0023250 A1 | * | 2/2007 | Mepham et al. | 192/54.3 |
| 2007/0220960 A1 | * | 9/2007 | JaVaherian | 73/117.2 |

* cited by examiner

Primary Examiner—Edward Lefkowitz
Assistant Examiner—Jonathan Dunlap

(57) ABSTRACT

An easily packaged torque monitoring system accurately captures driveline torque data for use by engine, transmission or other vehicle controllers. The torque monitoring system utilizes a structural member to hydraulically connect a driving member with a driven member. A pressure-sensing device is operatively connected with a fluid chamber in the structural member through which the driving member drives the driven member. The pressure-sensing device senses a pressure level within the chamber. The amount of torque transmitted from the driving member to the driven member is directly linearly related to the sensed pressure. In one embodiment, the pressure-sensing device is a surface acoustic wave sensor in contact with the hydraulic fluid that wirelessly relays a sensor signal (i.e., a signal with a value corresponding with sensed pressure and thus with torque) to a controller.

14 Claims, 3 Drawing Sheets

TORQUE MONITORING SYSTEM AND METHOD OF MONITORING ENGINE TORQUE

TECHNICAL FIELD

The invention relates to a system of monitoring torque in a drive train based on sensed pressure.

BACKGROUND OF THE INVENTION

Monitoring engine torque in the drive train of a vehicle allows the engine, the transmission and vehicle controls to utilize this information to modify engine output, transmission ratio as well as motor/generator speed or torque, in the case of a hybrid transmission. Known torque monitoring systems present a variety of challenges. For example, a mechanically-mounted strain gauge presents packaging challenges due to electronic wiring needed to interconnect the strain gauge with a control signal receiver and controller. Additionally, magnetorestrictive technologies used to sense torque have significant packaging issues and may be cost prohibitive.

A magnetorestrictive material having magnetic characteristics that change with a change in torque requires the use of a drive line shaft or other torque-transmitting component having a nickel content that is cost prohibitive both from a material and processing standpoint. Additionally, packaging of a pick-up component, such as wire brushes, that can relay the magnetic change of the shaft, is difficult and requires additional assembly time.

SUMMARY OF THE INVENTION

An easily packaged torque monitoring system accurately captures driveline torque data for use by engine, transmission or other vehicle controllers. The torque monitoring system utilizes a structural member to hydraulically connect a driving member with a driven member. The structural member forms at least a portion of a fluid chamber. The driving member pressurizes the fluid chamber to drive the driven member. Thus the mechanical force of the driving member is converted to hydraulic force that drives the driven member. A pressure-sensing device is operatively connected with the fluid in the fluid chamber. The pressure-sensing device senses a pressure level within the chamber. The amount of torque transmitted from the driving member to the driven member is directly linearly related to the sensed pressure.

In one embodiment, the pressure-sensing device is a surface acoustic wave sensor in contact with the hydraulic fluid that wirelessly relays a sensor signal (i.e., a signal with a value corresponding with sensed pressure and thus with torque) to an electronic controller. The controller may then convert the pressure level to a torque value and provide a control signal to adjust an operating condition of the transmission, the engine or another vehicle component. The surface acoustic wave sensor may be a commercially available wireless tire pressure sensor. In another embodiment, the pressure-sensing device is a pressure regulator valve fluidly connected with the pressurized fluid chamber.

The pressurized fluid chamber may be formed by a cylindrical structural member connected with a driven member, such as a plate connected for rotation with a torque converter turbine, referred to herein as a back plate. The driving member may be a flex plate connected with a piston that moves within the chamber to transfer torque via hydraulic pressure from the flex plate to the back plate.

In another embodiment the pressurized fluid chamber may be formed by a flexible diaphragm connected between the driving and driven members that flexes in response to rotation of the driving member, thus pressurizing the fluid contained within the diaphragm to drive the driven number.

A method of monitoring engine torque includes hydraulically connecting first and second coaxial rotatable members by providing a hydraulic chamber therebetween. The first rotatable member is driven by the engine and the second rotatable member is operatively connected with the transmission. The method includes rotating the first rotatable member to thereby rotatably drive the second rotatable member via pressure resulting in the hydraulic chamber. The method further includes sensing a level of pressure within the chamber and relaying a sensor signal representing the sensed pressure to a controller. The sensor signal may then be converted to a level of engine torque, as they are directly and linearly related. An operating condition of the engine or transmission or other vehicle component may be adjusted based on the relayed sensor signal.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
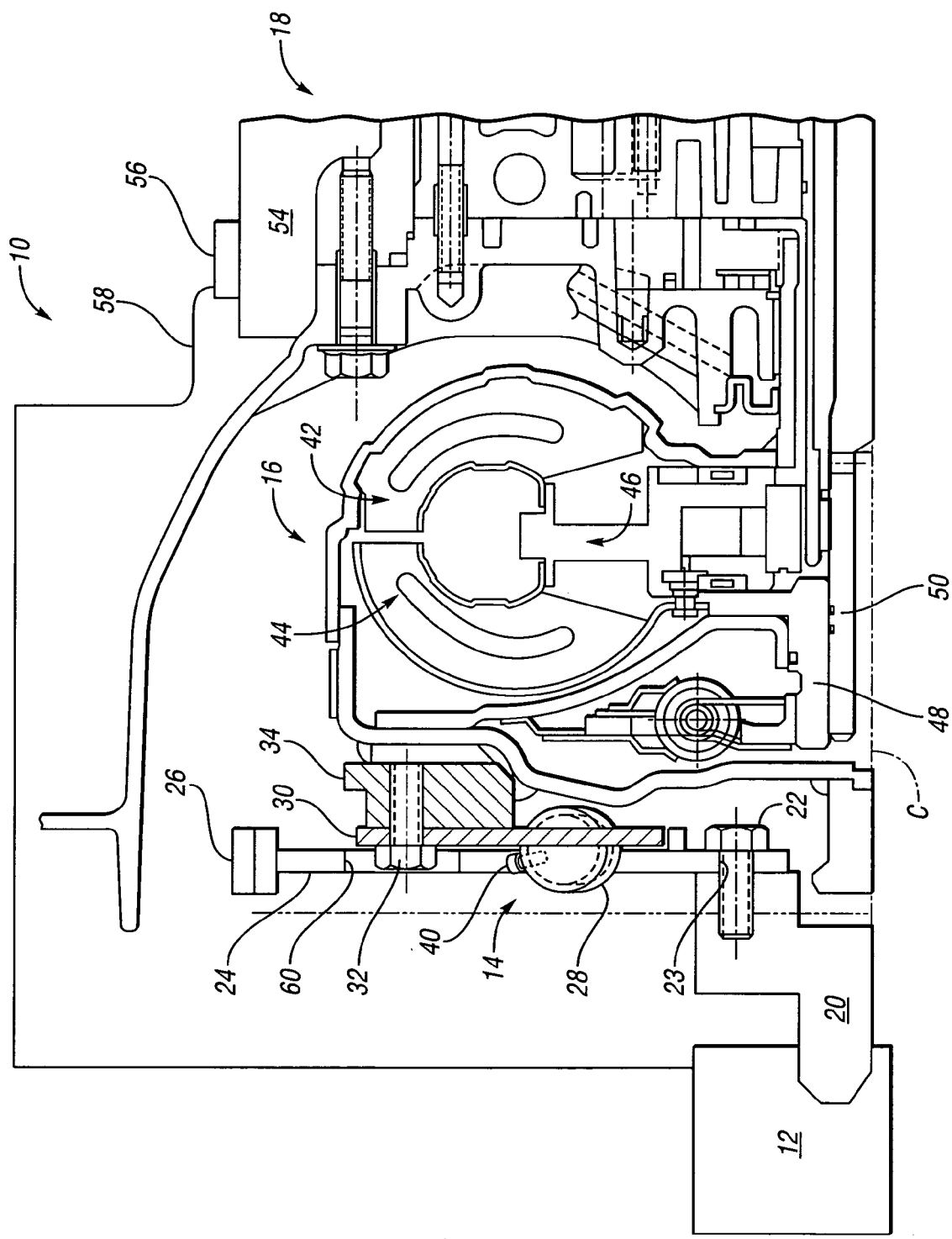
FIG. 1 is a schematic fragmentary partially cross-sectional side view illustration of a vehicle drive train employing a first embodiment of a torque monitoring system within the scope of the invention (cross-section taken at arrows shown in FIG. 2)

Referring to the drawings wherein like reference numbers refer to like components, a vehicle drivetrain 10 is shown in FIG. 1. The drivetrain 10 includes an engine 12 connected via a torque monitoring system 14 to a torque converter 16 and a transmission 18. Only the upper half of the drive train 10 is shown in FIG. 1 (i.e., the portion above the axis of rotation C).

The engine 12 drives an engine output shaft 20 that is bolted via bolts 22 to a flex plate 24. The bolts 22 are received in bolt openings 23 in the flex plate 24. Only one bolt 22 and opening 23 are shown. However, the engine output shaft 20 and flex plate 24 circumscribe the axis of rotation C and have additional bolts 22 and openings 23 distributed thereabout. The flex plate 24 is also referred to herein as a first rotatable member or a driving member. A starter gear 26 is arranged at the outer periphery of the flex plate 24 and is powered by a starter motor (not shown) to start the engine 12.

The flex plate 24 is part of the torque monitoring system 14. The torque monitoring system 14 also includes a structural member 28 and a back plate 30. The back plate 30 is coaxial with the flex plate 24, is generally annular and also circumscribes the axis of rotation C. The structural member 28 is connected between the flex plate 24 and the back plate 30. The back plate 30 may also be referred to herein as a second rotatable member or a driven member. The back plate 30 is connected via bolts 32 to a torque converter housing 34. The torque converter 16 includes a torque converter housing 34, a pump portion 42, a turbine portion 44, a stator portion 46 and a torque converter output element 48. The torque converter housing 34 surrounds and is operatively connected for rotation with a pump portion 42 of the torque converter 14. Operation of the torque converter 16 is known in the art. The back plate 30 is rotatably driven through the structural member 28 by rotation of the flex plate 24 as will be explained herein. The torque monitoring system 14 also includes a pressure-sensing device 40 that, in the embodiment shown in FIG. 1, is preferably a wireless surface acoustic wave sensor. Wireless surface acoustic wave sensors are commercially available and are used, for example, to sense tire pressure. Rotation of the back plate 30 rotates the pump portion 42 of the torque converter 16 which creates a fluid coupling to drive the turbine portion 44. The stator portion 46 is axially centered between the pump portion 42 and turbine portion 44. The fluid coupling between the pump portion 42 and the turbine portion 44 drives the torque converter output element 48 that is connected thereto.

Transmission input shaft 50 is splined or otherwise connected for rotation with the torque converter output element 48. Thus, the engine 12 drives the transmission 18 through the torque monitoring system 14 and the torque converter 16. A transmission valve body 54 contains a multitude of hydraulic valves controlled by an electronic controller 56 to control torque-transmitting mechanisms such as clutches and brakes within the transmission 18, as is known in the art. The controller 56 may receive wireless or electronic sensor signals from various components such as the engine 12 and the transmission 18. Additionally the controller 56 may relay control signals to the transmission 18 (i.e., through the valve body 54) or to the engine 12, for example, a control signal may be relayed to the engine 12 from the controller 56 along control signal wire 58. It should be appreciated that separate controllers may be utilized for the engine 12 and the transmission 18 or a single controller may control functioning of both. The controller or controllers may instead be wirelessly connected with the respective engine and transmission.

Figure 2:
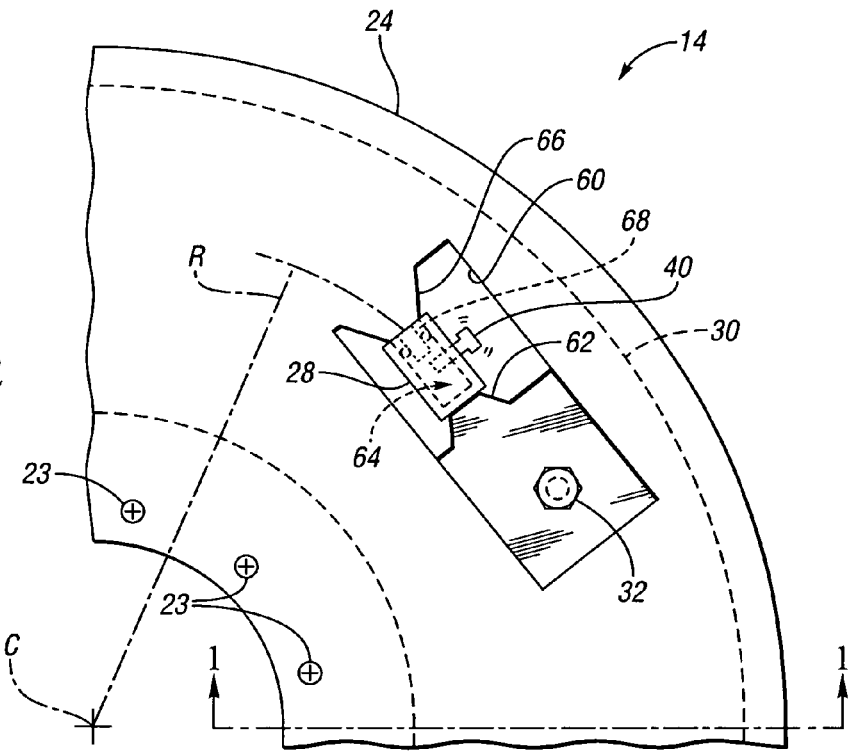
FIG. 2 is a schematic fragmentary illustration in front view, rotated clockwise 90 degrees with respect to FIG. 1) of the torque monitoring system of FIG. 1.
Figure 3:
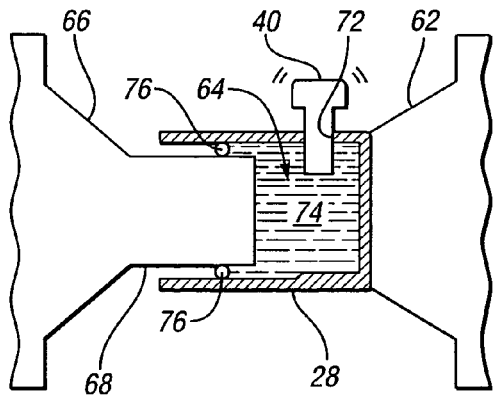
FIG. 3 is a schematic fragmentary partially cross-sectional illustration of the torque monitoring system of FIGS. 1 and 2 having a piston and cylinder arrangement.

Operation of the torque monitoring system 14 of FIG. 1 will now be described with respect to the embodiment of FIGS. 2 and 3. The flex plate 24 has an opening or window 60 formed, machined or otherwise provided therein. The opening or window 60 is also shown in FIG. 1. The back plate 30 is axially adjacent the flex plate 24 as shown in FIG. 1. A portion of the back plate 30 is visible through the window 60 of FIG. 2. The structural member 28 is supported on an extension 62 of the back plate 30. The structural member 28 forms a chamber 64 that contains hydraulic fluid 74. An extension 66 of the flex plate 24 forms or supports a piston 68 slidable within the chamber 64. The structural member 28 with its fluid-filled chamber 64, the piston 68 and extensions 62, 66 create a hydraulic connection along radius R within the window 60 between the flex plate 24 and back plate 30. As may be better viewed in FIG. 3, a wireless sensor 40 is supported in an opening 72 in the structural member 28 such that the sensor 40 is in contact with fluid 74 contained within the chamber 64. Thus, the wireless sensor 40 is mounted to sense hydraulically transferred torque. Mechanically mounting a surface acoustic wave torque sensor in the torque path of a vehicle driveline, i.e., a torque sensor mounted to sense torque within a rigid structural component, would be sensitive to various levels of torque acting in multiple planes of the component and is thus not well suited for driveline or vehicle controls. By isolating torque along the hydraulic connection between the flex plate 24 and the back plate 30, this problem is avoided. Seal rings 76 prevent leakage of the fluid 74 between the structural member 28 and the piston 68.

When the engine 12 drives engine output member 20 to rotatably drive the flex plate 24 (all shown in FIG. 1), the flex plate 24 drives the back plate 30 through the hydraulic connection established by the torque monitoring system 14. Specifically, clockwise rotation of the flex plate 24 in FIG. 2 will cause the piston 68 to pressurize the fluid 74 within the hydraulic chamber 64 to create a force on the inner surfaces of the cylindrical structure 28. This will drive the back plate 30 in a clockwise direction as well. The back plate 30, because it is bolted to the torque converter housing 34 (shown in FIG. 1) will rotatably drive the torque converter pump portion 42 to thereby drive the turbine portion 44 and the transmission 18. The engine output shaft 20, the flex plate 24, the back plate 30, the torque converter housing 34, the pump portion 42, the turbine portion 44, the torque converter output element 48 and the transmission input shaft 50 all rotate about the axis of rotation C.

The pressure-sensing device 40 is in contact with the fluid 74. As discussed above, the pressure-sensing device 40 is preferably a surface acoustic wave sensor, as known in the art, which transmits a wireless signal corresponding with the sensed pressure level of the fluid. Such wireless surface acoustic wave pressure sensors are used in vehicle tires to monitor tire pressure. Referring again to FIG. 1, the surface acoustic wave sensor 40 transmits a wireless sensor signal that is received by the controller 56. The controller 56 contains a processor programmed to convert the sensor signal indicating pressure level into a corresponding torque value according to a stored algorithm. As is understood by those skilled in the art, torque of the engine conveyed through the engine output member 20 results in a force at an effective radius R measured from the axis of rotation C of the engine output member 20. The force acts over an effective area of the cylindrical structural member 28. The magnitude of the force is equal to the engine torque divided by the radius R, as is known in the art. The effective area is a cross-sectional area in a plane perpendicular to the force. The force results in a pressure within the chamber 64 equal to the force divided by the effective area. The pressure is thereby proportional to engine torque. The pressure-sensing device 40, by relaying the sensed pressure value to the controller 56, enables the controller 56 to vary operating conditions according to stored algorithms and programs in response to the sensed pressure. For example, the controller may change the degree of engine valve lift to effect engine power and torque, or may change the transmission ratio by selectively engaging a torque-transmitting mechanism or by controlling speed of a motor/generator in the case of a hybrid transmission. Because the torque monitoring system 14 allows a sensed pressure that is linearly related to engine torque, the torque monitoring system 14 permits control based upon torque values.

Figure 4:
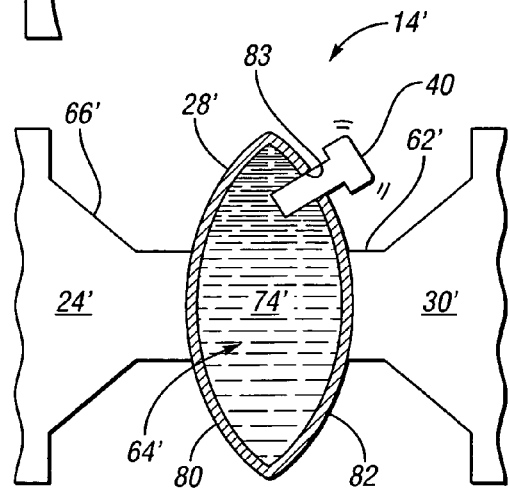
FIG. 4 is a schematic fragmentary partial cross-sectional illustration in view of a second embodiment of a torque monitoring system that may be employed in the vehicle drivetrain of FIG. 1.

Referring to FIG. 4, an alternative embodiment of a torque monitoring system 14' includes an alternative structural member 28' having a flexible diaphragm structure. The flexible diaphragm 28' may be an elastomeric material similar to a brake booster diaphragm. First and second halves 80, 82 of flexible diaphragm 28' are movable relative to one another. Thus, the flexible diaphragm 28' flexes to allow movement of the flange portion 66' of the flex plate 24' toward the flange portion 62' of the backing plate 30' when the flex plate 24' rotates, thus increasing fluid pressure within a chamber 64' enclosed by the first and second halves 80, 82, respectively of the diaphragm 28'. The pressure-sensing device 40 is supported within an opening 83 through the second half 82 of the flexible diaphragm 28', allowing a portion of the sensor 40 into contact with the fluid 74' to monitor the pressure thereof. As with the torque monitoring system 14 of FIG. 2, the hydraulic connection established by the flexible diaphragm 28' allows the flex plate 24' to rotatably drive the back plate 30'.

Figure 5:
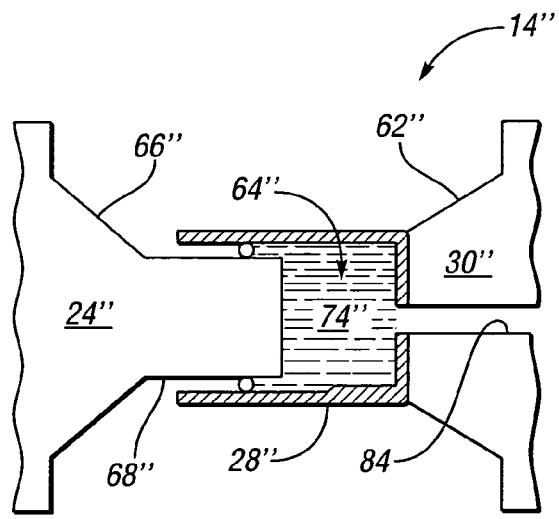
FIG. 5 is a schematic fragmentary illustration in partial cross-sectional view of a third embodiment of a torque monitoring system.
Figure 6:
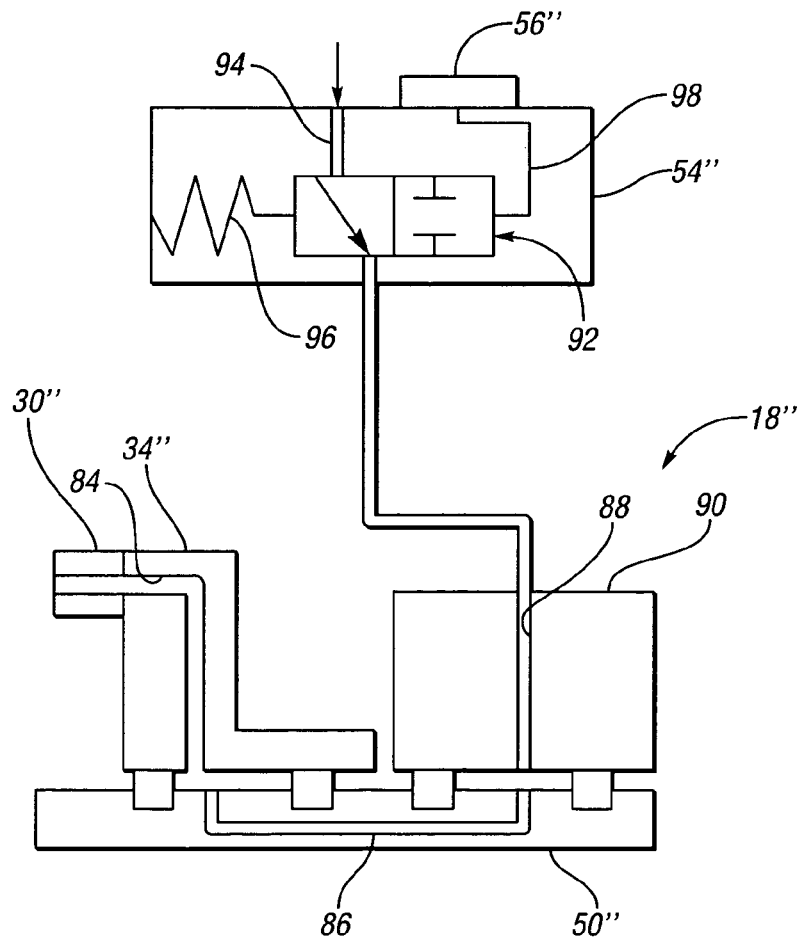
FIG. 6 is a schematic cross-sectional side view illustration of a drive train utilizing the torque monitoring system of FIG. 5.

Referring to FIGS. 5 and 6, a second alternative embodiment of the torque monitoring system 14" is illustrated. The torque monitoring system 14" utilizes hydraulic componentry to monitor pressure. As with the embodiments of FIGS. 1 through 3, the flex plate 24" has an extension 66" which forms a piston 68" that is movable within a cylindrical walled structural member 28" formed or supported by an extension 62" of the back plate 30". The back plate 30" is bolted to a torque converter housing 34" and the flex plate 24" is connected with an engine output shaft as in the embodiment of FIG. 1. Movement of the piston 68" pressurizes fluid 74" within the chamber 64". A hydraulic channel 84 is formed through the back plate 30" and torque converter housing 34" (see FIG. 6) in fluid communication with a hydraulic channel 86 in the transmission input shaft 50". A portion of the housing 34" extends radially inward toward the shaft 50". The hydraulic channel 86 is in turn in fluid communication with a flow channel 88 through transmission housing structure 90 of the transmission 18". The transmission housing structure 90 may be a center support member or outer casing of transmission 18". Or any transmission member capable of having a channel routed therethrough. Alternatively, flexible tubing may be employed to establish the required fluid connections rather than channels. The pressurized fluid channel 88 is in fluid communication with a pressure regulator valve 92 contained in a valve body 54". Alternative channels may be utilized to route fluid from the chamber 64" to the pressure regulator valve 92. Those skilled in the art will readily understand the operation of a pressure regulator valve to accomplish the comparison of pressure level with a known line pressure level and create a corresponding sensor signal. Hydraulic line or system pressure 94 as well as electrical power 96 is supplied to the pressure regulator valve 92 that then compares pressure supplied from the channel 98 with a known line pressure 94 to provide a control signal 98 proportional to the sensed pressure level. The sensor signal 98 may be relayed to an electronic controller 56" which may then be wirelessly or otherwise connected with the engine 12 and with the transmission 18" to control an operating condition thereof based upon the sensed pressure level.

Referring to the structure described with respect to FIGS. 1 through 5, a method of monitoring engine torque includes hydraulically connecting first and second coaxial rotatable members. That is, the flex plate 24 and the back plate 30 are hydraulically connected via the enclosed fluid chamber 64 provided therebetween. A piston and cylindrical structural member design may be used as in the embodiment of FIGS. 1-3 and that of FIGS. 5 and 6. Alternatively, the flexible diaphragm 83 of the embodiment of FIG. 4 may be used. The first rotatable member of the flex plate 24 is driven by the engine 12 and the second rotatable member or back plate 30 is operatively connected with the transmission 18. The method includes rotating the first rotatable member or flex plate 28 to thereby rotate the second rotatable member or back plate 30 via the pressure in the hydraulic chamber 64 resulting from rotation of the flex plate 28. The method further includes sensing hydraulic pressure within the chamber 64. A pressure-sensing device such as the wireless surface acoustic wave sensor 40 or the hydraulic pressure regulator valve 92 of the embodiments of FIGS. 5 and 6 is utilized for the sensing step. The method further includes relaying a signal corresponding with the sensed pressure to an electronic controller 56 (or 56" in the embodiment of FIGS. 5 and 6). If a pressure regulator valve such as valve 92 of FIG. 6 is utilized, relaying is accomplished by providing fluidly connected channels 84, 86, 88 in communication with the pressure regulator valve 92.

The method further includes converting the sensed pressure to a level of engine torque. Optionally, a stored algorithm within the controller 56 converts pressure levels (or sensor signals correlated with pressure levels) into a corresponding torque value. The controller 56 then calculates a control signal based on the corresponding torque value. The control signal is then relayed to the engine 12, the transmission 18 or any other vehicle component to carry out the step of adjusting an operating condition (such as engine speed or transmission ratio) based on the sensed pressure value and corresponding engine torque.

While the best modes for carrying out the invention have been described in detail, those familiar with the art to which this invention relates will recognize various alternative designs and embodiments for practicing the invention within the scope of the appended claims.

The invention claimed is:

1. A torque monitoring system comprising:
    a rotatable torque transmitting device having:
        a driving member;
        a driven member;
        a structural member operatively connected to at least one of said driving member and said driven member and at least partially forming a fluid chamber between said members; wherein rotation of said driving member pressurizes said fluid chamber to thereby rotatably drive said driven member; and
    a pressure-sensing device operatively connected with said fluid chamber for sensing a pressure level in said chamber; wherein an amount of torque transmitted from said driving member to said driven member is directly proportional to said sensed pressure level.

2. The torque monitoring system of claim 1, wherein said driving member is connected for common rotation with an engine output shaft; wherein said driven member is operatively connected with a transmission input shaft and further comprising:
    a torque converter forming a fluid coupling between said driven member and said transmission input shaft; wherein said fluid chamber is independent of said fluid coupling.

3. The torque monitoring system of claim 1, wherein said driving member is a flex plate connected for common rotation with an engine output shaft;
    wherein said driven member is operatively connected with a transmission input shaft; wherein said amount of torque is equal to engine torque, said sensed pressure level thereby being mathematically correlated with engine torque.

4. The torque monitoring system of claim 3, wherein said pressure sensing device is operable for providing a sensor signal proportionate to said sensed pressure, and farther comprising:

a controller in signal communication with said pressure-sensing device and operable for receiving a sensor signal from said pressure-sensing device and for providing a control signal to one of said engine and said transmission, wherein said control signal is calculated based on said sensed pressure level.

5. The torque monitoring system of claim 1, wherein said structural member is a cylindrical wall and further comprising:
 a piston connected with said driving member movable within said structural member when said driving member rotates; wherein movement of said piston pressurizes said chamber.

6. The torque monitoring system of claim 1, wherein said structural member is a flexible diaphragm.

7. The torque monitoring system of claim 1, wherein said pressure-sensing device is a wireless surface acoustic wave sensor.

8. The torque monitoring system of claim 1, wherein said pressure-sensing device is a pressure regulator valve operable for providing a sensor signal correlated with said pressure level.

9. The torque monitoring system of claim 1, further comprising:
 a controller in signal communication with said pressure-sensing device, and operable for receiving a sensor signal from said pressure-sensing device and for controlling rotation of said driving member based on said sensed pressure level.

10. A torque monitoring system for a vehicle drivetrain including an engine with an engine output shaft and a transmission, comprising:
 a first rotatable member rotatably driven by said engine;
 a second rotatable member;
 a structural member at least partially forming a closed fluid chamber between said first and second rotatable members; wherein rotation of said first rotatable member pressurizes said chamber to rotatably drive said second rotatable member;
 a pressure sensor mounted in contact with said fluid chamber and operative to sense a pressure level within said chamber and transmit a sensor signal correlated with said sensed pressure; wherein said first rotatable member is a flex plate connected for common rotation with the engine output shaft and is operatively connected with the transmission, said sensed pressure level being mathematically correlated with torque of the engine; and
 a controller in signal communication with said pressure sensor and operable for receiving said sensor signal and varying an operating condition of the drivetrain based on said sensor signal.

11. The torque monitoring system of claim 10, wherein said pressure sensor is a surface acoustic wave pressure sensor.

12. The torque monitoring system of claim 11, further comprising:
 a torque converter coupling said engine to said transmission, wherein said first rotatable member is a flex plate connected for common rotation with the engine output shaft;
 and wherein said second rotatable member is connected with said torque converter.

13. A method of monitoring engine torque comprising:
 hydraulically connecting first and second coaxial rotatable members by providing a hydraulic chamber connected therebetween; wherein said first rotatable member is driven by an engine and said second rotatable member is operatively connected with a transmission;
 rotating said first rotatable member via engine torque to thereby rotate said second rotatable member via pressure in said hydraulic chamber resulting from rotation of said first rotatable member;
 sensing a level of pressure within said chamber;
 relaying a signal corresponding with said sensed level of pressure to a controller; and
 adjusting an operating condition of one of said engine and said transmission based on said relayed signal.

14. The method of claim 13, further comprising:
 converting said sensed level of pressure to a level of engine torque.

* * * * *